United States Patent
Wang et al.

(10) Patent No.: US 11,681,923 B2
(45) Date of Patent: Jun. 20, 2023

(54) MULTI-MODEL STRUCTURES FOR CLASSIFICATION AND INTENT DETERMINATION

(71) Applicant: SAMSUNG ELECTRONICS CO., LTD., Gyeonggi-Do (KR)

(72) Inventors: Yu Wang, Bellevue, WA (US); Yilin Shen, Mountain View, CA (US); Yue Deng, Sunnyvale, CA (US); Hongxia Jin, San Jose, CA (US)

(73) Assignee: SAMSUNG ELECTRONICS CO., LTD., Gyeonggi-do (KR)

(*) Notice: Subject to any disclaimer, the term of this patent is extended or adjusted under 35 U.S.C. 154(b) by 611 days.

(21) Appl. No.: 16/728,987

(22) Filed: Dec. 27, 2019

(65) Prior Publication Data

US 2020/0334539 A1     Oct. 22, 2020

Related U.S. Application Data

(60) Provisional application No. 62/836,552, filed on Apr. 19, 2019.

(51) Int. Cl.
*G06N 3/084* (2023.01)
*G06N 20/20* (2019.01)
(Continued)

(52) U.S. Cl.
CPC ........... *G06N 3/084* (2013.01); *G06F 18/241* (2023.01); *G06N 3/045* (2023.01); *G06N 20/20* (2019.01);
(Continued)

(58) Field of Classification Search
CPC ...... G06N 3/084; G06N 20/20; G06N 3/0454; G06K 9/6268
See application file for complete search history.

(56) References Cited

U.S. PATENT DOCUMENTS 9,292,492 B2   3/2016   Sarikaya et al.
9,454,960 B2   9/2016   Stewart
(Continued)

FOREIGN PATENT DOCUMENTS

KR     101913191 B1    10/2018
WO    2020009297 A1    9/2020
(Continued)

OTHER PUBLICATIONS

EP Appln. No. EP20791369, Extended European Search Report, dated Feb. 22, 2022, 9 pg.
(Continued)

*Primary Examiner* — Utpal D Shah
(74) *Attorney, Agent, or Firm* — Cuenot & Forsythe & Kim, LLC

(57) ABSTRACT

Intent determination based on one or more multi-model structures can include generating an output from each of a plurality of domain-specific models in response to a received input. The domain-specific models can comprise simultaneously trained machine learning models that are trained using a corresponding local loss metric for each domain-specific model and a global loss metric for the plurality of domain-specific models. The presence or absence of an intent corresponding to one or more domain-specific models can be determined by classifying the output of each domain-specific model.

26 Claims, 8 Drawing Sheets

(51) Int. Cl.
*G06F 18/241* (2023.01)
*G06N 3/045* (2023.01)
*G06V 10/764* (2022.01)
*G06V 10/778* (2022.01)
*G06V 10/94* (2022.01)

(52) U.S. Cl.
CPC ........ *G06V 10/764* (2022.01); *G06V 10/7784* (2022.01); *G06V 10/94* (2022.01)

(56) References Cited

U.S. PATENT DOCUMENTS

| | | | |
|---|---|---|---|
| 10,565,758 B2* | 2/2020 | Hadap | G06N 3/0454 |
| 10,796,200 B2* | 10/2020 | Sutic | G06V 30/194 |
| 2010/0138222 A1* | 6/2010 | Herbig | G10L 15/065 |
| | | | 704/243 |
| 2014/0163959 A1 | 6/2014 | Hebert et al. | |
| 2017/0116985 A1 | 4/2017 | Lambert et al. | |
| 2017/0300814 A1 | 10/2017 | Shaked et al. | |
| 2017/0372199 A1 | 12/2017 | Hakkani-Tur et al. | |
| 2018/0286395 A1 | 10/2018 | Xiaolong et al. | |
| 2019/0068171 A1* | 2/2019 | Li | H03H 21/0043 |
| 2019/0325313 A1* | 10/2019 | Shamir | G06N 3/0445 |
| 2020/0286273 A1* | 9/2020 | Chen | G06T 11/60 |
| 2020/0311186 A1* | 10/2020 | Wang | G06V 10/454 |
| 2020/0372305 A1* | 11/2020 | Streeter | G06N 20/00 |
| 2021/0383280 A1* | 12/2021 | Shaloudegi | G06N 7/005 |

FOREIGN PATENT DOCUMENTS

WO  WO-2021223873 A1 * 11/2021
WO  WO-2022067355 A1 *  3/2022

OTHER PUBLICATIONS

Dean, T., "Inferring Mesoscale Models of Neural Computation," Google Research, Arxiv.org, Cornell University Library, Oct. 14, 2017, retrieved from the Internet: <https://arxiv.org/abs/1710.05183>, 39 pg.

"Dialogflow," [online] Google Cloud, [retrieved Oct. 21, 2019], retrieved from the Internet: <https://dialogflow.com/>, 5 pg.

"Getting Started with Rasa," [online] Rasa Technologies Inc. © 2019 [retrieved Oct. 21, 2019], retrieved from the Internet: <https://rasa.com/docs/getting-started/>, 2 pg.

"Technology for a voice-enabled world," [online] SoundHound Inc. © 2019 [retrieved Oct. 21, 2019], retrieved from the Internet: <https://www.soundhound.com>, 7 pg.

Wang, Y. et al., "A New Concept of Convex based Multiple Neural Networks Structure," In Proc. of the 18th International Conference on Autonomous Agents and Multiagent Systems (AAMAS 2019), Montreal, Canada, May 13-17, 2019, IFAAMAS, 9 pages.

WIPO Appln. No. PCT/KR2020/003857, International Search Report and Written Opinion, Jun. 29, 2020, 10 pg.

* cited by examiner

MULTI-MODEL STRUCTURES FOR CLASSIFICATION AND INTENT DETERMINATION

CROSS-REFERENCE TO RELATED APPLICATIONS

This application claims the benefit of U.S. Provisional Patent Application No. 62/836,552 filed on Apr. 19, 2019, which is fully incorporated herein by reference.

TECHNICAL FIELD

This disclosure relates to machine learning, and more particularly, to multi-model structures generated using machine learning.

BACKGROUND

A machine learning system is trained rather than explicitly preprogrammed to perform a given task. Given a task, or class of tasks, a machine learning system learns to perform the task based on experience. Thus, a machine learning system's performance, however measured, improves with experience. A machine learning system learns in the sense that the system can generate rules (e.g., classify utterances or images) based on input to the system and the results expected from the input. Specifically, a machine learning system can discover statistical structure in example inputs and generate rules for automating a given task according to the structure. Machine learning systems find wide application in various fields such as natural language understanding (NLU) and computer vision.

SUMMARY

In one or more embodiments, a method includes generating a plurality of convex coefficients based on output generated by a plurality of computer-implemented machine learning models in response to receiving training data. The method also includes iteratively adjusting, using computer hardware, one or more of the plurality of convex coefficients using a convex coefficient machine learning rule.

In one or more embodiments, a system includes a processor configured to initiate operations. The operations include generating an output from each of a plurality of domain-specific models in response to a received input, wherein the domain-specific models are simultaneously trained machine learning models trained using a corresponding local loss metric for each domain-specific model and a global loss metric for the plurality of domain-specific models. The operations also include determining a presence or absence of intent corresponding to each domain-specific model by classifying the output of each domain-specific model.

In one or more embodiments, a method includes generating, with computer hardware, an output from each of a plurality of domain-specific models in response to a received input, wherein the domain-specific models are simultaneously trained machine learning models trained using a corresponding local loss metric for each domain-specific model and a global loss metric for the plurality of domain-specific models. The method also includes determining, with the computer hardware, a presence or absence of intent corresponding to each domain-specific model by classifying the output of each domain-specific model.

In one or more embodiments, a computer program product includes a computer readable storage medium having instructions stored thereon. The instructions are executable by a processor to initiate operations. The operations include generating an output from each of a plurality of domain-specific models in response to a received input, wherein the domain-specific models are simultaneously trained machine learning models trained using a corresponding local loss metric for each domain-specific model and a global loss metric for the plurality of domain-specific models. The operations also include determining a presence or absence of intent corresponding to each domain-specific model by classifying the output of each domain-specific model.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
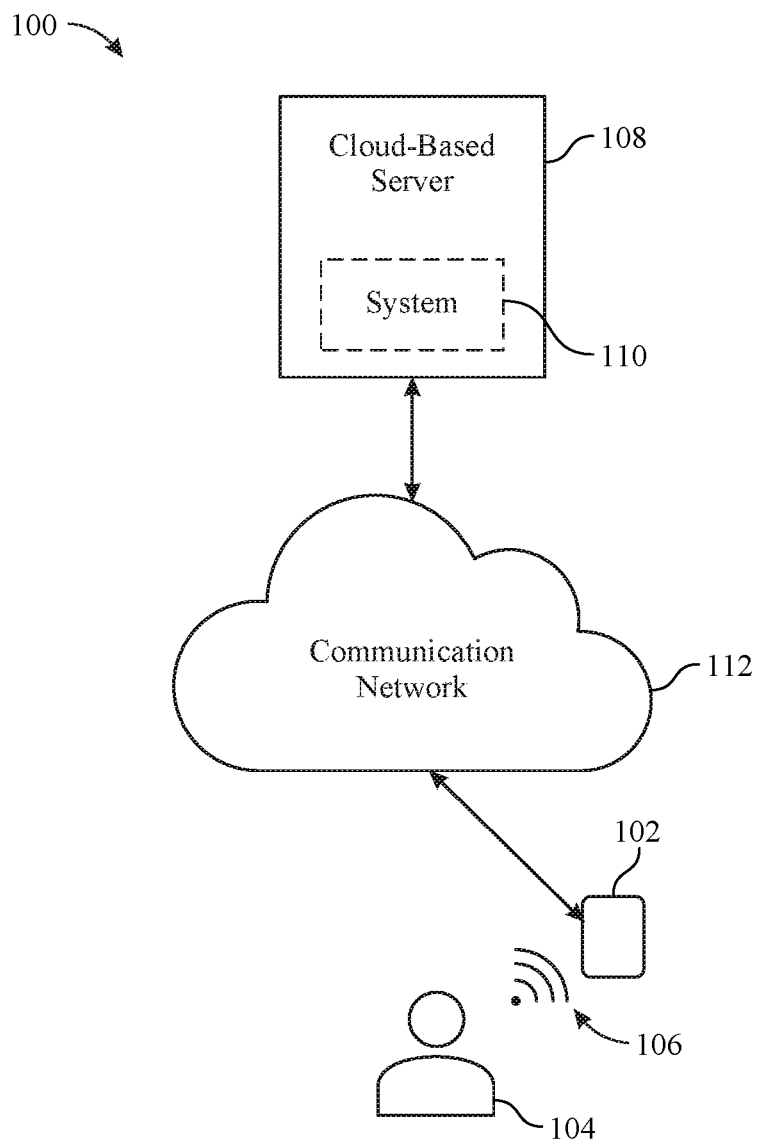
FIG. 1 depicts an example communication environment in which a system implementing a multi-model structure operates according to an embodiment.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to machine learning, and more particularly, to multi-model structures generated using machine learning. The multi-model structures, in various embodiments, can be implemented in a system for determining multiple intents from a single utterance (text or speech converted to text by a speech-to-text processor) and/or relationships among multiple objects within an image.

In certain embodiments, the multi-model structures are the basis for implementing spoken language understanding (SLU) systems. SLU combines elements of signal processing, pattern recognition, machine learning, and artificial intelligence. The goal of SLU is not merely to recognize speech, but rather to extract "meaning" from an utterance by targeting specific SLU tasks within a specific domain. For example, in an airline reservation domain, a SLU system may be tasked with discerning an intent from a user utterance such as "I want to fly to Boston from New York next week." Accordingly, the targeted understanding task of the system is to extract task-specific arguments within a given frame-based semantic representation comprising Destination and Departure Date.

Many SLU systems rely most heavily on machine learning, perhaps reflecting the robustness of statistically based methods relative to rules-based methods. Thus, for a SLU task such as that described with respect to airline reservations, understanding or extracting an intent from an utterance requires a specific machine learning model that has been trained for classifying utterances within a specific domain. A conventional SLU system is trained for a specific task with respect to a single domain, determine a single intent from an utterance. A system based on a multi-model structure, however, can identify multiple intents from multiple domains based on the single utterance.

Conventional SLU systems operate independently of one another. Thus, even if multiple conventional SLU systems—each using a separately trained model with respect to a different domain—are combined, the combination of conventional SLU systems is unlikely to correctly identify every intent from each of the separate domains because no one system is able to share information with any other system. By contrast, the SLU system based on a multi-model structure can identify multiple intents, even from a single utterance, by leveraging collaborative information that is generated by multiple models and that is shared among the multiple models.

As defined herein, "intent" is a user objective. The objective can be expressed in a user utterance or an image. An "utterance," as defined herein, is one or more words contained in a text or in speech converted to text by a speech-to-text processor. An example of an utterance is a sentence whereby the utterance is followed by a pause if the utterance is spoken, or by a period or other punctuation mark (e.g., dash) if the utterance is written. For example, a definite pause following a vocalization such as, I'm interested in flying to New York next week can indicate that the utterance is completed with the word week. Were the same utterance written, the utterance would end with a period. A period indicates a completed utterance in contrast to, for example, a comma, which indicates that the words following the comma merely clarify the words preceding the comma. Accordingly, in the context of speech, a definite pause between two separate sequences of speech can indicate two different sentences, each comprising a distinct utterance.

Another example of demarcation of distinct utterances is an interactive exchange between a user and another entity (human or machine). A user's utterance stops when the other entity begins speaking, and a new utterance begins when the user resumes speaking. This type of turn-taking during a dialogue can arise, for example, in the context of an interactive voice response (IVR) system that allows a user to interact with a computer though the use of vocal utterances.

A user intent, for example, can be to book an airline flight, rent a car, or reverse a hotel room, the intent expressed in a user utterance comprising words spoken or text entered into a device such as a smartphone or other device. An intent is expressed in an image by processing the image using a machine learning model that is trained to identify images of text and/or of discrete objects (e.g., an airplane, automobile, or hotel) that are identified by text. Thus, the user intent to book an airline flight, rent a car, or reverse a hotel room also can be discerned, for example, from images of text and/or objects in a travel brochure that may be captured by a camera integrated in the smartphone or other device.

The example embodiments disclosed herein provide methods, systems, and computer program products that can extract different intents in the context of different domains from a single utterance. Moreover, one or more of the multiple intents may be implicit rather than explicitly articulated, with unarticulated intents inferred from other intents explicitly expressed in the single utterance. One of the additional aspects of the disclosed embodiments is the simultaneous determination of the relative importance of each of the multiple intents.

The methods, systems, and computer program products apply to other fields as well. For example, in certain embodiments, the multi-model structures can provide the basis of a system for detecting relationships among multiple objects within a given image. In other embodiments, a multi-model structure is used to determine one or more mutual intents from a dialogue between multiple users communicating with one another using separate devices.

In accordance with one or more embodiments, a multi-model structure can be created by training multiple models (e.g., neural networks) using machine learning. The multi-model structure is created by generating a plurality of convex coefficients based on output generated by a plurality of computer-implemented models in response to a set of training data. One or more of the convex coefficients can be iteratively adjusted using a convex coefficient machine learning rule. The parameters of the multiple models are determined based on model-specific local loss metrics in combination with a global loss metric, defined herein. The global loss metric can be determined based on a difference between a correct classification of the training data and an estimated classification of the training data generated by the plurality of computer-implemented models (e.g., neural networks). The estimated classification of the training data can be a sum of outputs generated by the plurality of computer-implemented models, each of which is weighted by a corresponding convex coefficient.

The multi-model structure can be implemented in various systems tasked, for example, with performing SLU functions related to human-machine interactions. A SLU function, for example, can be to determine a user intent based on a speech utterance of the user and to classify the utterance as part of a call center application or airline reservation system. The system applications relate to various types of human-machine interactions, covers a broad range of complex tasks from speech summarization to voice search and speech retrieval. The system also can involve tasks relating to human-human interactions, such as retrieving a phone call with a certain person about a particular topic.

Such a system, relying on a multi-model structure, can generate an output from each of a plurality of models in response to a received user input (e.g., utterance). The system can determine multiple user intents from the user input by classifying the input, which is represented by a feature vector generated by the system based on the input. The system performs the classifying by combining outputs generated by multiple models using the multi-model structure. Each of the multiple models, in certain embodiments, can comprise an intent-specific neural network. The system can combine the outputs by generating a weighted sum of the outputs generated by the multiple models, each output weighted by a convex coefficient. The system can determine each convex coefficient by generating an initial plurality of coefficients and iteratively adjusting one or more of the plurality of coefficients based on a convex coefficient machine learning rule, the convex coefficient machine learning rule determined using a global loss metric.

In other embodiments, the system implementing a multi-model structure can be tasked, for example, with identifying relationships between objects appearing in an image. In still other embodiments, the system can be tasked with determining the intents of multiple users based on input from multiple devices of multiple users. Accordingly, for determining the intents of multiple users, the multiple models incorporated in a multi-model structure can each comprise a user-specific model, and the multi-model classifier can determine the multiple user intents based on a dialog between the multiple users carried out using the multiple devices.

The different arrangements described herein are directed to computer technology and provide improvements to computer technology. For example, the present arrangements improve the speed and accuracy of computer technology directed to determining user intent from a speech utterance and/or relationship of objects within an image. A system based on a multi-model structure can determine multiple intents from multiple domains based on a single utterance. Moreover, a multi-model structure is trained as a single structure rather than as distinct models that must each be trained separately. This improves the speed of training using machine learning. It is noted that many existing systems rely on neural networks, which are widely perceived as taking longer to train relative to other machine learning models. The present arrangements thus can significantly reduce the training time by training a single entity—that is, the multi-model structure that incorporates multiple neural networks—rather than separately training multiple entities.

Aspects of the multi-model structure are faster training time, greater predictive accuracy, and less susceptibility to the vanishing gradient problem. With respect to training time, a conventional neural network, notwithstanding the model's predictive power, is widely viewed as being slow to train. The slowness may stem, at least in part, from conventional training of a neural network using backpropagation. Backpropagation is based on gradient descent optimization, which in the context of neural network training involves calculating the gradient of non-linear activation functions. The multi-model structure, by contrast, reduces reliance on backpropagation. Although backpropagation is used in training the multi-model structure, the use is limited, being to a significant extent supplanted by an iterative adjusting of convex coefficients and a combination of local loss and global loss metrics. The convex coefficients are adjusted according to a convex coefficient machine learning rule described herein. Whereas backpropagation involves calculating gradients, updating the convex coefficients is based on a linear difference equation, which provides relatively faster convergence.

With respect to the vanishing gradient problem, conventional training using gradient descent (e.g., using the chain rule to calculate partial derivatives) involves updating a neural network's parameters in proportion to the partial derivatives of a cost function. In some cases, the gradient (partial derivatives) will be extremely, or "vanishingly," small, which can effectively prevent updating of the neural network's parameters or terminate the training altogether. The multi-model structure training described herein, by contrast, relies on a global loss metric as well as local loss metrics. The global loss metric, a convex combination of functions, is itself a convex function. The faster convergence in updating the convex coefficients lessens the likelihood of a vanishing gradient.

Further aspects of the embodiments described within this disclosure are described in greater detail with reference to the figures below. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 depicts an example communications environment 100 in which a system comprising a multi-model structure operates according to an embodiment. Communications environment 100 illustratively includes user device 102, which can receive from user 104 speech utterances 106 as well as other inputs (e.g., text). User device 102 can be a smartphone, virtual assistant, or other such device. Communication environment 100 also illustratively includes server 108. Executing on server 108 is system 110, which as described in greater detail below, implements a multi-model structure for determining intents from an utterance (text or speech converted to text by a speech to text processor) of user 104 and/or relationships among multiple objects within an image captured by user device 102.

User device 102 communicates with server 108, illustratively a cloud-based server, over data communications network 112. Data communications network 112 can provide communication links between various devices and data processing systems. The communication links can include connections, such as wired communication links, wireless communication links, or fiber optic cables. The communication links can be implemented as, or include, one or more (or any combination of) different communication technologies such as a Wide Area Network (WAN), a Local Area Network (LAN), a wireless network (e.g., a wireless WAN and/or a wireless LAN), a mobile or cellular network, a Virtual Private Network (VPN), the Internet, a Public Switched Telephone Network (PSTN), and so forth. Devices capable of coupling to data communications network 112 via wired and/or wireless communication links can include smartphones, virtual assistants, personal computers, portable computing or communication devices, network computers, tablet computers, mobile phones, or the like.

Figure 2:
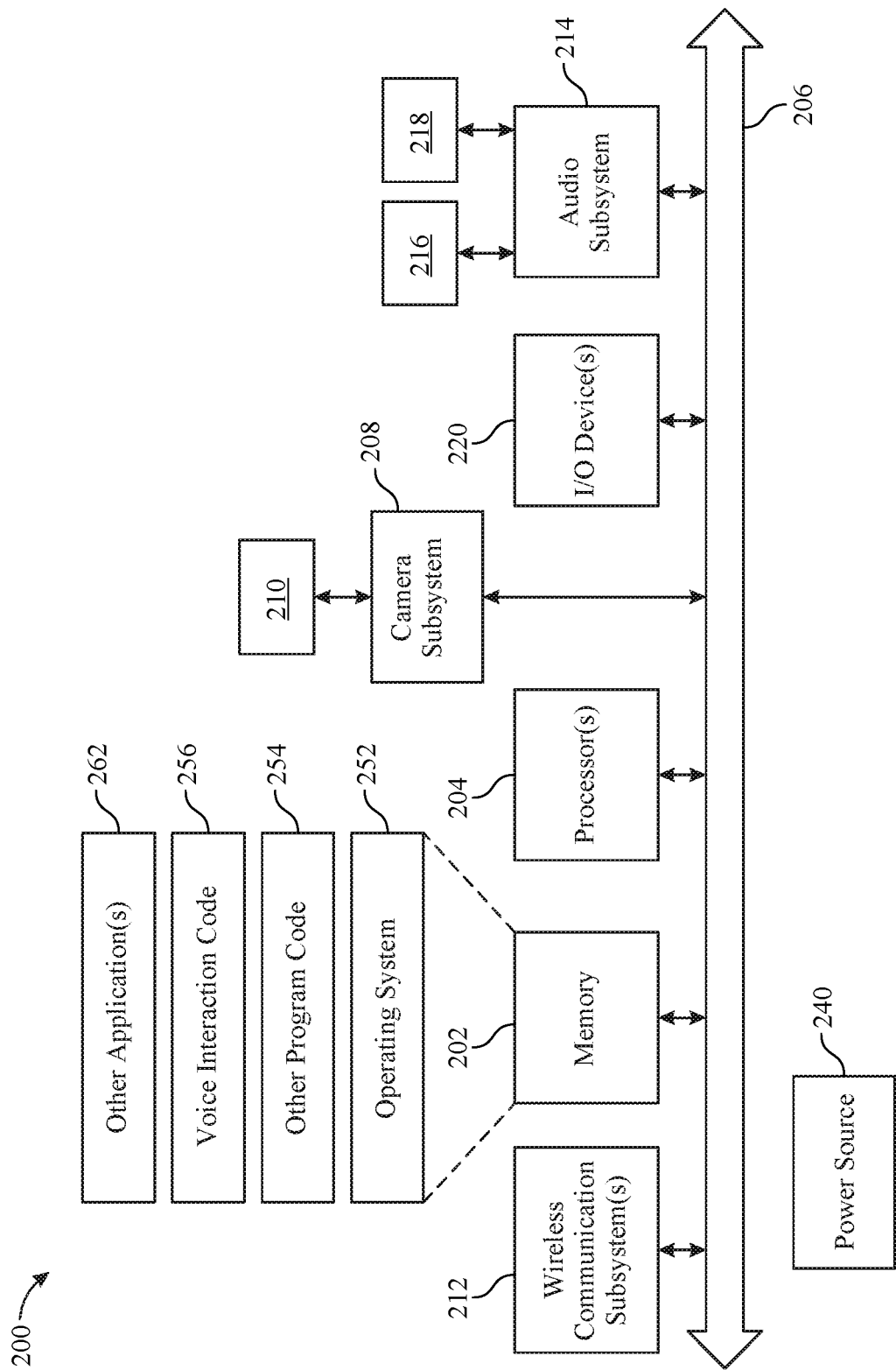
FIG. 2 depicts an example user device that interacts over a communication network with a system implementing a multi-model structure according to an embodiment.

FIG. 2 depicts user device 200, which is representative of a user device such as user device 102 of FIG. 1. User device 200 illustratively includes memory 202, one or more processors 204 (e.g., image processors, digital signal processors, data processors), and interface circuitry 206. Memory 202, processor(s) 204, and/or interface circuitry 206, in some embodiments, are implemented as separate components. In other embodiments, memory 202, processor(s) 204, and/or interface circuitry 206 are integrated in one or more integrated circuits. The various components of user device 200 can be coupled, for example, by one or more communication buses or signal lines (e.g., interconnects and/or wires). In one embodiment, memory 202 is coupled to interface circuitry 206 via a memory interface (not shown).

User device 200 illustratively includes camera subsystem 208, which can be coupled to optical sensor 210. Optical sensor 210 can be implemented using any of a variety of technologies. Examples of optical sensor 210 include a charged coupled device (CCD), a complementary metal-oxide semiconductor (CMOS) optical sensor, and the like. Camera subsystem 208 and optical sensor 210 can be used to facilitate camera functions, such as recording images and/or video clips.

Communication functions can be facilitated through one or more wireless communication subsystems 212. Wireless communication subsystem(s) 212 can include radio frequency receivers and transmitters, optical (e.g., infrared) receivers and transmitters, and so forth. The specific design and implementation of wireless communication subsystem(s) 212 can depend on the specific type of user device 200 implemented and/or the type of communications network(s) over which user device 200 is intended to operate.

For purposes of illustration, wireless communication subsystem(s) 212 may be designed to operate over one or more mobile networks (e.g., GSM, GPRS, EDGE), a Wi-Fi network that may include a WiMax network, a short-range wireless network (e.g., a Bluetooth network), and/or any combination of the foregoing. Wireless communication subsystem(s) 212 can implement hosting protocols such that user device 200 can be configured as a base station for other wireless devices.

Audio subsystem 214 can be coupled to a speaker 216 and a microphone 218 to facilitate voice-enabled functions, such as voice recognition, voice replication, digital recording, audio processing, and telephony functions. Audio subsystem 214 is representative of a subsystem used with embodiments described below for receiving spoken utterances of a device user. Audio subsystem 214 can generate various types of audio data.

Input/output (I/O) devices 220 can be coupled to interface circuitry 206. Examples of I/O devices 220 include, for example, display devices, touch-sensitive display devices, track pads, keyboards, pointing devices, communication ports (e.g., USB ports), network adapters, buttons or other physical controls, and so forth. A touch-sensitive device such as a display screen and/or a pad is configured to detect contact, movement, breaks in contact, and the like using any of a variety of touch sensitivity technologies. Example touch-sensitive technologies include, for example, capacitive, resistive, infrared, and surface acoustic wave technologies, other proximity sensor arrays or other elements for determining one or more points of contact with a touch-sensitive device, and the like. One or more of I/O devices 220 may be adapted to control functions of sensors, subsystems, and such of user device 200.

User device 200 further includes a power source 240. Power source 240 is able to provide electrical power to various elements of user device 200. In one embodiment, power source 240 is implemented as one or more batteries. The batteries may be implemented using any of a variety of different battery technologies, whether disposable (e.g., replaceable) or rechargeable. In another embodiment, power source 240 is configured to obtain electrical power from an external source and provide power (e.g., DC power) to the elements of user device 200. In the case of a rechargeable battery, power source 240 further may include circuitry that is able to charge the battery or batteries when coupled to an external power source.

Memory 202 can include random access memory (e.g., volatile memory) and/or non-volatile memory, such as one or more magnetic disk storage devices, one or more optical storage devices, flash memory, and so forth. Memory 202 can store operating system 252, such as LINUX, UNIX, a mobile operating system, an embedded operating system, and the like. Operating system 252 may include instructions for handling system services and for performing hardware-dependent tasks.

Memory 202 may additionally store other program code 254. Examples of other program code 254 can include instructions to facilitate communicating with one or more additional devices, one or more computers, and/or one or more servers; graphic user interface processing; processing instructions to facilitate sensor-related functions; phone-related functions; electronic messaging-related functions; Web browsing-related functions; media processing-related functions; GPS and navigation-related functions; security functions; camera-related functions, including Web camera and/or Web video functions; and so forth. Memory 202 may also store one or more other applications 262.

Memory 202 may store voice interaction program code 256. Voice interaction program code 256 can be used, for example, by a user to interact audibly with a network-based system (e.g., airline, auto, and/or hotel reservation system). User device 200 can communicatively couple with such a system over a data communications network such as data communications network 112 of FIG. 1. Accordingly, the user device 200 can interact with a network-based system over a data communications network through spoken utterances.

The various types of instructions and/or program code described are provided for purposes of illustration and not limitation. The program code may be implemented as separate software programs, procedures, or modules. Memory 202 can include additional instructions or fewer instructions. Moreover, various functions of user device 200 may be implemented in hardware and/or software, including in one or more signal processing and/or application-specific integrated circuits.

Program code stored within memory 202 and any data used, generated, and/or operated on by user device 200 are functional data structures that impart functionality to a device when employed as part of the device. Further examples of functional data structures include, for example, sensor data, data obtained via user input, data obtained via querying external data sources, baseline information, and so forth. The term "data structure" refers to a physical implementation of a data model's organization of data within a physical memory. As such, a data structure is formed of specific electrical or magnetic structural elements within a memory. A data structure imposes physical organization on the data stored in the memory that is used by a processor.

User device 200 can include fewer components than those shown or include additional components other than those shown in FIG. 2 depending on the specific type of system that is implemented. Additionally, the particular operating system and/or application(s) and/or other program code included may also vary according to system type. Moreover, one or more of the illustrative components can be incorporated into, or otherwise form a portion of, another component. For example, a processor may include at least some memory.

User device 200 is provided for purposes of illustration and not limitation. A device and/or system configured to perform the operations described herein may have a different architecture than illustrated in FIG. 2. The architecture may be a simplified version of user device 200 and may include a processor and memory storing instructions. Example implementations of user device 200 include, for example, a smartphone or other mobile device, a wearable computing device (e.g., smartwatch), a computer (e.g., desktop, laptop, tablet computer, virtual assistant, smart TV, other data processing system), or other electronic device. It will be appreciated that embodiments can be deployed as a stand-alone device or deployed as multiple devices in a distributed client-server networked system. For example, in certain embodiments, a smartwatch can operatively couple to a mobile device (e.g., phone). The mobile device may or may not be configured to interact with a remote server and/or computer system.

A user device such as user device 200 of FIG. 2 can communicatively couple to a networked server or other computing node over a data communications network. A system executing on the networked computing node can implement a multi-model structure for determining intents from an utterance (spoken or text-based) of a user (e.g., voice interaction code 256) and/or relationships among multiple objects within an image captured by the user device as described below (e.g., one or more of other application(s) 262).

Figure 3:
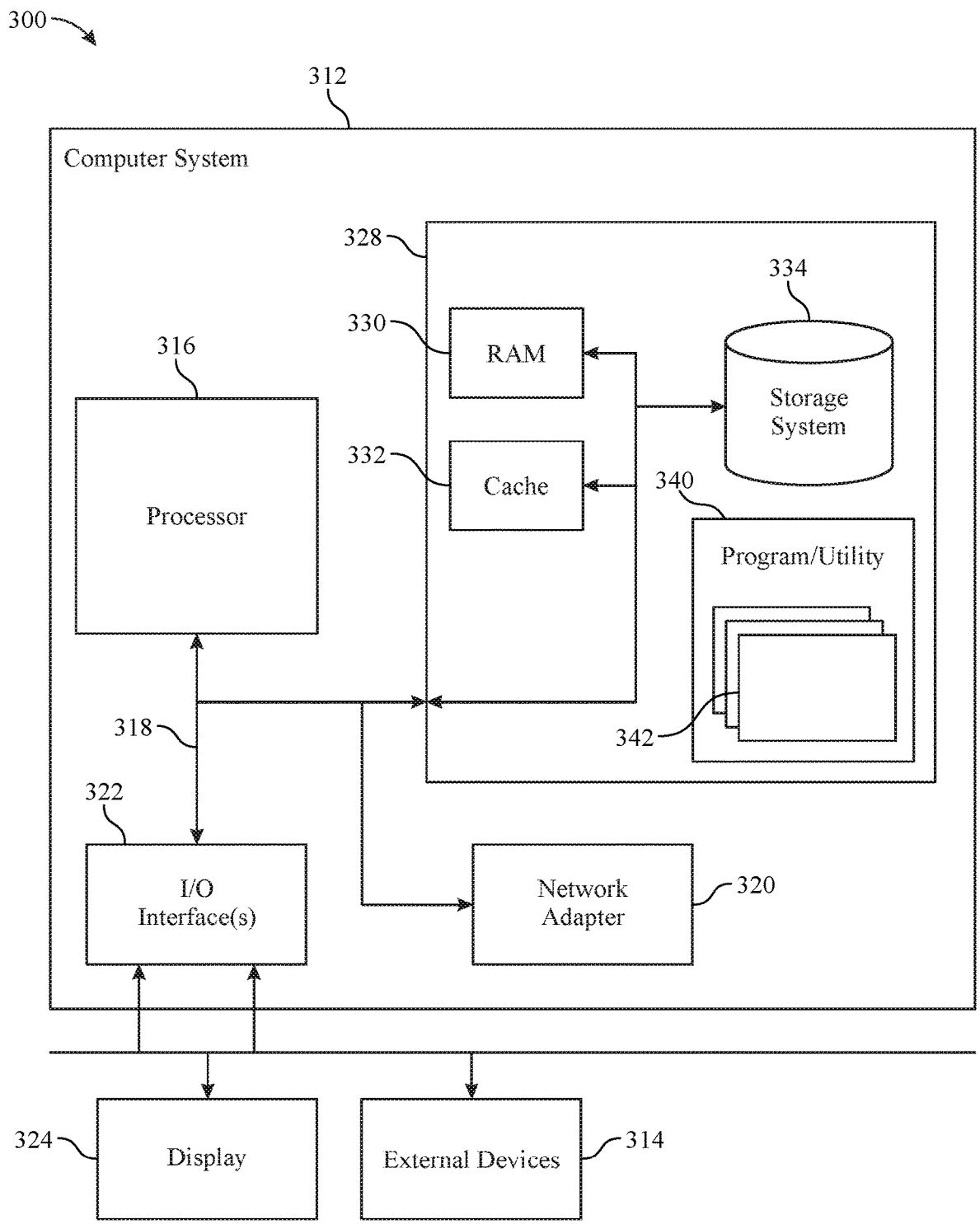
FIG. 3 depicts a networked computing node in which a system implementing a multi-model structure executes according to an embodiment.

FIG. 3 illustrates example computing node 300. In one or more embodiments, computing node 300 is an example cloud-based computing node (e.g., cloud-based server). Computing node 300 can perform any of the functionality described within this disclosure and is not intended to suggest any limitation as to the scope of use or functionality of embodiments of the invention described herein.

Computing node 300 illustratively includes a computer system 312, which is operational with numerous other general-purpose or special-purpose computing system environments or configurations. Examples of well-known computing systems, environments, and/or configurations that may be suitable for use with computer system 312 include, but are not limited to, smartphones, virtual assistants, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system 312 may be described in the general context of computer system-executable instructions, such as program modules, being executed by a computer system. Generally, program modules may include routines, programs, objects, components, logic, data structures, and so on that perform particular tasks or implement particular abstract data types. Computer system 312 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 3, computer system 312 is shown in the form of a general-purpose computing device (e.g., server). The components of computer system 312 may include, but are not limited to, one or more processors 316, a memory 328, and a bus 318 that couples various system components including memory 328 to processor 316. A processor comprises hardware circuitry configured to carry out instructions. The hardware circuitry may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

Bus 318 represents one or more of any of several types of bus structures, including a memory bus or memory controller, a peripheral bus, an accelerated graphics port, and a processor or local bus using any of a variety of bus architectures. By way of example only, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer system 312 typically includes a variety of computer system-readable media. Such media may be any available media that is accessible by computer system 312, and may include both volatile and non-volatile media, removable and non-removable media.

Memory 328 may include computer system readable media in the form of volatile memory, such as random-access memory (RAM) 330 and/or cache memory 332. Computer system 312 may further include other removable/non-removable, volatile/non-volatile computer system storage media. By way of example, storage system 334 can be provided for reading from and writing to a non-removable, non-volatile magnetic media and/or solid-state drive(s) (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 318 by one or more data media interfaces. As will be further depicted and described below, memory 328 may include at least one program product having a set (e.g., at least one) of program modules that are configured to carry out the functions of embodiments of the invention.

Program/utility 340, having a set (at least one) of program modules 342, may be stored in memory 328 by way of example, and not limitation, as well as an operating system, one or more application programs, other program modules, and program data. Each of the operating system, one or more application programs, other program modules, and program data or some combination thereof, may include an implementation of a networking environment. Program modules 342 generally carry out the functions and/or methodologies of embodiments of the invention as described herein. Specifically, one or more of the program modules can implement a system for determining intents from a speech utterance of user and/or relationships among multiple objects within an image based on one or more multi-model structures described herein.

Program/utility 340 is executable by processor 316. Program/utility 340 and any data items used, generated, and/or operated upon by computer system 312 are functional data structures that impart functionality when employed by computer system 312.

Computer system 312 may also communicate with one or more external devices 314 such as a keyboard, a pointing device, a display 324, etc.; one or more devices that enable a user to interact with computer system 312; and/or any devices (e.g., network card, modem, etc.) that enable computer system 312 to communicate with one or more other computing devices. Such communication can occur via I/O interfaces 322. Still, computer system 312 can communicate with one or more networks such as a LAN, a general WAN, and/or a public network (e.g., the Internet) via network adapter 320. As depicted, network adapter 320 communicates with the other components of computer system 312 via bus 318. It should be understood that although not shown, other hardware and/or software components could be used in conjunction with computer system 312. Examples, include, but are not limited to: microcode, device drivers, redundant processing units, external disk drive arrays, RAID systems, tape drives, and data archival storage systems, etc.

While computing node 300 is used to illustrate an example of a cloud computing node, it should be appreciated that a computer system using an architecture the same as or similar to that described in connection with FIG. 3 may be used in a non-cloud computing implementation to perform the various operations described herein. In this regard, the example embodiments described herein are not intended to be limited to a cloud computing environment. Computing node 300 is an example of a data processing system. As defined herein, "data processing system" means one or more hardware systems configured to process data, each hardware system including at least one processor programmed to initiate operations and memory.

Computing node 300 is an example of computer hardware. Computing node 300 may include fewer components than shown or additional components not illustrated in FIG. 3 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

Figure 4:
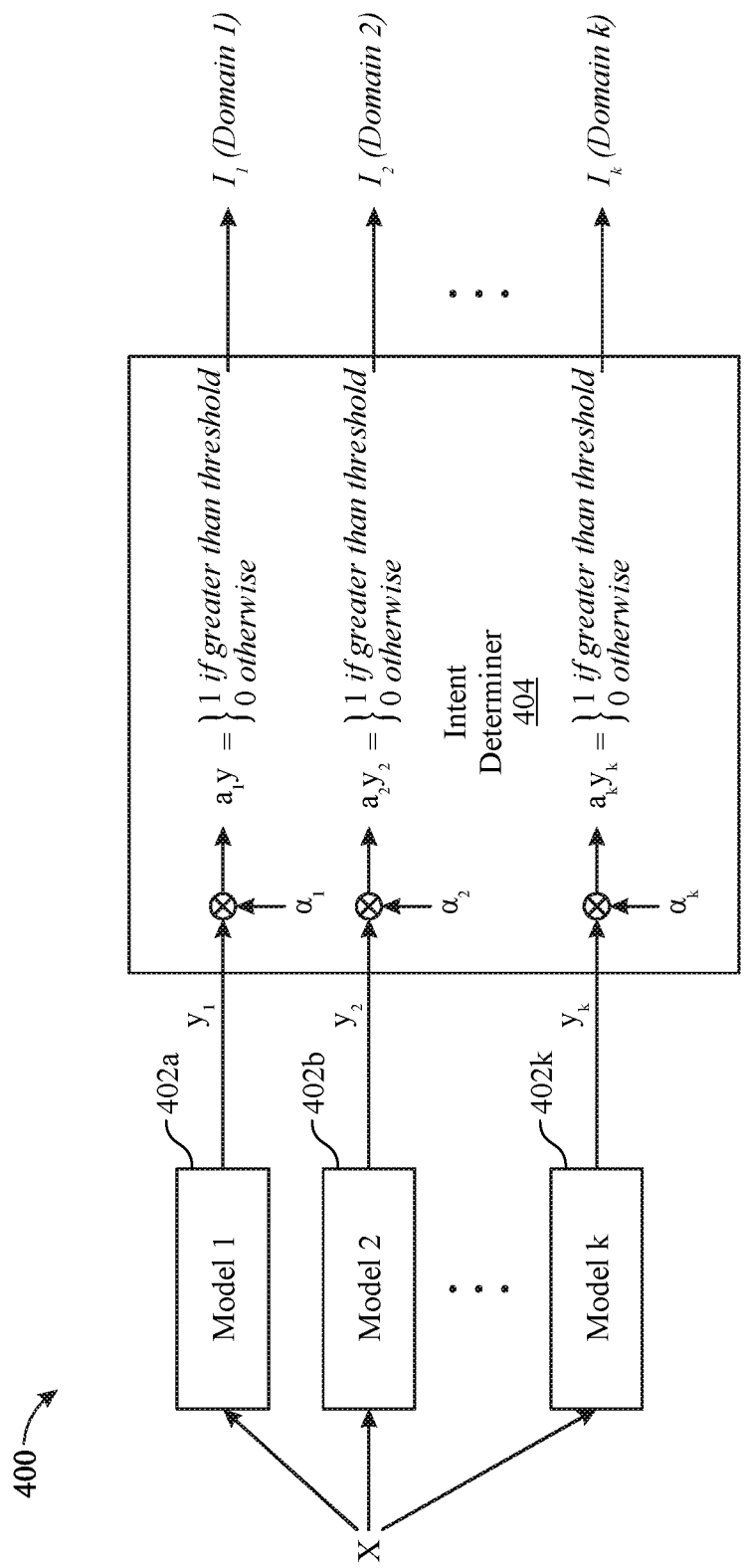
FIG. 4 schematically illustrates certain operative features of a multi-model structure for determining user intents based on utterances according to an embodiment.

FIG. 4 schematically illustrates certain operative features of multi-model structure 400, in accordance with one embodiment. Multi-model structure 400 can be implemented in a system running on a server or other networked computing node. Based on the multi-model structure 400 the system can determine a user intent from a user utterance communicated to the system over a data communications network.

Intent determination can be relevant in many different situations. In the context of an automated reservation system, for example, a user utterance can express several intents. For instance, a user utterance conveyed via a smartphone or virtual assistant may take the form "can you book a flight for me from New York to San Francisco on May 1, to stay two days at the Hilton, using a rental car from Hertz—and can you tell me the price?" The user utterance expresses four separate intents: book a flight; rent a car; reserve a hotel room; and determine a price with respect to each. Two intents are only implicit, referencing Hilton rather than hotel and Hertz rather than car rental. The last intent only implicitly refers to separate prices for the flight, car rental, and hotel, referring only to the singular form of price. Multi-model structure 400 operates to discern each intent from separate domains—airline flight, car rental, and hotel—and a shared feature common to each, determine price.

In general, multi-model structure 400 generates outputs $y_1, y_2, \ldots, y_k$ from k models, model 402a, model 402b, and 402k, respectively. Although only models 402a, 402b, and 402k are shown, it should be understood that any number of models can be incorporated in multi-model structure 400. Each model 402a-402k corresponds to a specific domain (e.g., airline flight, car rental, hotel reservation, price). The outputs are each generated in response to a user utterance (spoken or text-based), which the system preprocesses into a feature vector, x. Feature vector, x is input in whole into each domain-specific model 402a-402k. The output generated by each domain-specific model 402a-402k based on the input of feature vector, x, can be a real number between zero and one, reflecting the probability that a corresponding intent is present in the user utterance represented by feature vector, x. The outputs $y_1, y_2, \ldots, y_k$ are input to intent determiner 404. Intent determiner 404 multiples each output, $y_1, y_2, \ldots, y_k$ by a corresponding coefficient, $\alpha_1, \alpha_2, \ldots, \alpha_k$, respectively, the coefficients determined as described in detail below. In certain embodiments described in detail below, the coefficients comprise a set of convex coefficients.

In one or more embodiments, intent determiner 404 is a multi-input binary classifier which classifies the output of each domain-specific model into one of two states: presence or absence of intent. For example, if $\alpha_j y_j$ is greater than a predetermined threshold (e.g., 0.5), intent determiner 404 determines a corresponding intent is likely expressed in the user utterance represented by feature vector, x. Accordingly, intent determiner 404, based on each output of each domain specific model 402a-402k, generates a k-dimensional vector $[l_1, l_2, \ldots, l_k]$ of zeros and ones, a one indicating the presence of an intent in the user utterance. For example, in the context of the automated reservation system, if multi-model structure 400 models the domains flight, car rental, hotel reservation, flight price, rental price, hotel price, then a user utterance feature vector that generates the vector [1, 0, 1, 1, 0, 0] indicates that the user likely intends to book a flight and a hotel reservation, but is only requesting a price for the flight. Once the intents are determined based on multi-model structure 400, the automated reservation system performs downstream tasks such as tagging, filling slots, and extracting details necessary for completing a reservation request.

One aspect of multi-model structure 400 is use of the collective information from multiple, domain-specific models to create, using machine learning, a single structure, that is, a multi-model structure. A multi-model structure provides enhanced training rapidity. The multi-model structure convergences in fewer training steps or epochs and, once trained, provides similar or better prediction (or classification) accuracy than individually trained models. The multi-model structure provides other advantages described below.

Figure 5:
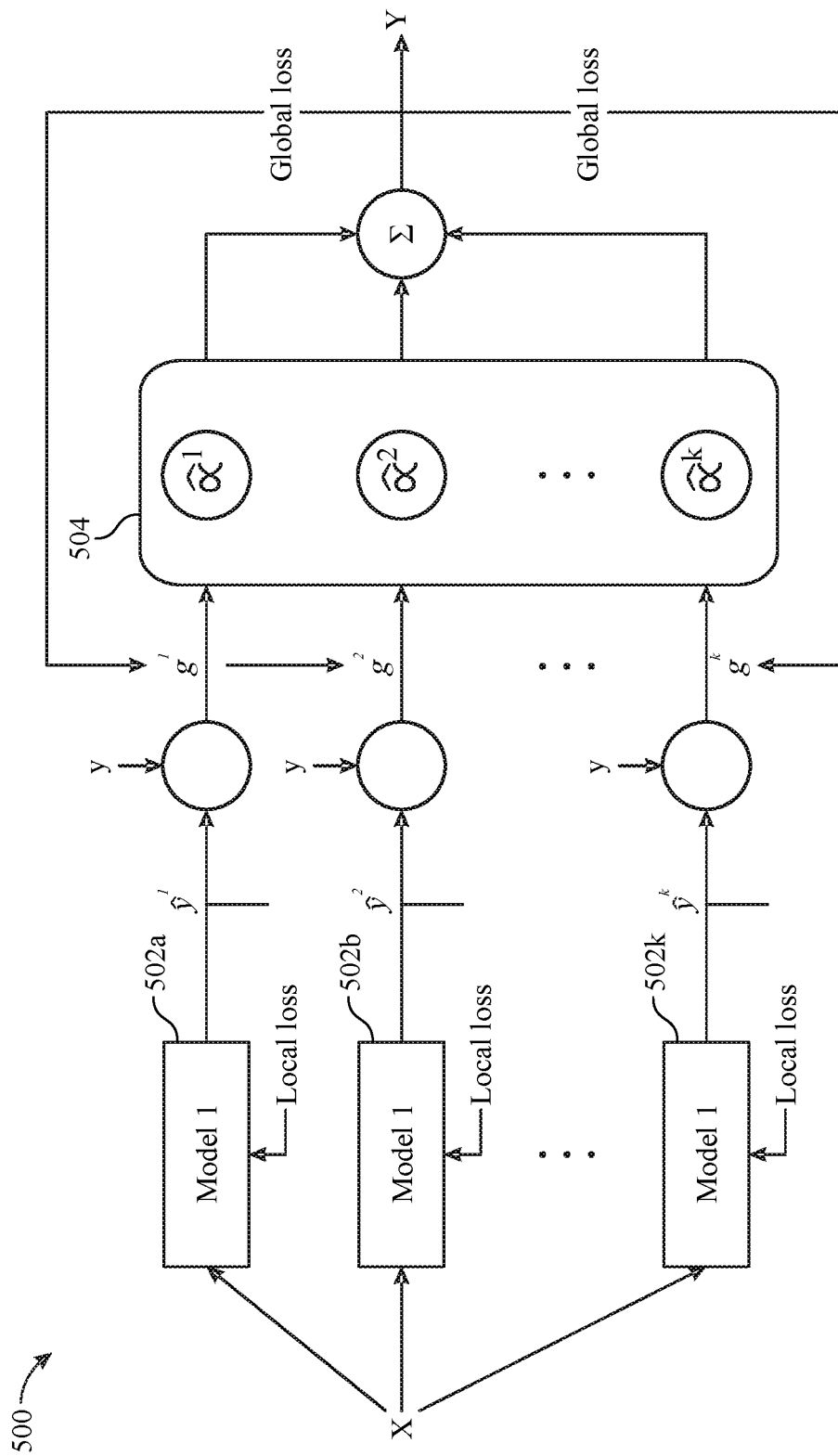
FIG. 5 schematically illustrates certain aspects of training a multi-model structure using machine learning according to an embodiment.

FIG. 5 schematically illustrates certain aspects of creating a multi-model structure 500 using machine learning according to an embodiment. Illustratively, multi-model structure 500 comprises domain-specific models 502a, 502b, and 502k. Although only three domain-specific models are shown, it should be understood that any number of domain-specific models can be incorporated in multi-model structure 500. Each domain-specific model 502a-502k is trained using feedback based on local loss metrics, each local loss metric corresponding to one of the domain-specific models. Training is also based on a global loss metric, which iteratively adjusts a set 504 of convex coefficient estimators. During training with a set of example inputs (feature vectors), outputs (values) generated by the models are compared to the true or target values corresponding to the example inputs. Errors are determined based on the differences between the model-generated values and the true or target values, the errors being used to iteratively update the parameters of the individual domain-specific models 502a-506k and the convex coefficients 504. The training procedures are now described in the context of each domain-specific model comprising a neural network. In other embodiments, however, multi-model structure 500 can be created using different machine learning models.

A neural network (or artificial neural network) is an algorithmic or circuit-based device that provides a robust approach to approximating, or "learning," a real-valued, a discrete-valued, or a vector-valued target function based on a set of training examples. A neural network structure typically comprises layers made up of interconnected nodes and an activation function. Patterns are presented to the neural network at an input layer that communicates to one or more hidden layers that perform the processing via a system of weighted connections. The hidden layers link to an output layer which yields the processing result. Operatively, the output is a mapping of input data to predictions. A loss function compares predictions to target values, generating a loss value, that is a measure of how well the predictions match the correct values of the examples. Backpropagational neural networks use gradient descent to tune parameters of the network to best fit a set of input-output pairs (x, y), where input x is an n-dimensional vector and y is the output generated by the neural network based on the input values.

In FIG. 5, models 502a, 502b, and 502k, respectively, are neural networks $N^1(w^1, x)$, $N^2(w^2, x)$, and $N^k(w^k, x)$. Although only three such neural networks are shown, it should be understood that any number of neural networks can be incorporated in multi-model structure 500. Each $N^i(w^i, x)$ classifies an input vector x by computing a value y, which represents a label assigned to x. The y is determined based on the weights $w^i$. The weights $w^i$ are determined based on a machine learning rule, according to which the weights, whose initial values may be arbitrarily set, are iteratively adjusted until the $N^i(w^i, x)$ is able to predict the output with an acceptable level of accuracy. The weights $w^i$ are determined using a set of training examples comprising input-output data pairs (x, y), wherein each input x corresponds to label y correctly assigned to the input. Over successive iterations, the output ŷ, as determined by neural network $N^i(w^i, x)$, is compared to the target y. A local loss metric determines the closeness of the model-predicted ŷ and the target y, and the weights $w^i$ are adjusted based on the machine learning rule. A separate set of test data is used to determine the accuracy of each $N^i(w^i, x)$.

During the training using machine learning, $\hat{w}^i$ is the estimation of the $w^i$, and $\hat{y}^i$ is the predicted output of the i-th neural network, $N^i(w^i, x)$. Accordingly, $$\hat{y}^i = N^i(\hat{w}_i, x). \qquad \text{EQ. 1}$$

The weights $w^i$ can be trained (iteratively adjusted) through backpropagation of the output error $e_t^i = \hat{y}_t^i - y_t$, where t is an index of the step or training epoch. Based on the machine learning using backpropagation, $\lim_{t \to \infty} \hat{y}_t^i = y_t$. That is, the predicted output $\hat{y}^i$ for each input x approaches the true value $y_t$ as the number of steps or training epochs increases, approaching infinity.

Rather than using each predicted output $\hat{y}^i$ to predict output $y_t$, a combination, termed a convex combination, of $\hat{y}^i = N^i(\hat{w}^i, x)$, $\forall i \in \{1, \ldots, k\}$, is used as the estimation of $y_t$ at each step t:

$$\hat{y}_t = \Sigma_{i=1}^k \hat{\alpha}_t^i N^i(\hat{w}_t^i, x_t), \qquad \text{EQ. 2}$$

where $\lim_{t \to \infty} \hat{y}_t^i = y_t$ if $\hat{\alpha}_t^i \to \alpha^i$. The i-th coefficient $\hat{\alpha}_t^i$, for i=1, ..., k, is an estimator of the i-th target convex coefficient $\alpha^i$ at step t, wherein the $\alpha^i$ satisfy the following condition:

$$y_t = \Sigma_{i=1}^k \alpha_t^i N^i(w_t^i, x_t). \qquad \text{EQ. 3}$$

The target coefficients $\alpha^1, \alpha^2, \ldots, \alpha^k$ are estimated by the set 504 of convex coefficient estimators $\hat{\alpha}^1, \hat{\alpha}^2, \ldots, \hat{\alpha}^k$. Convex coefficients are coefficients that satisfy the following convexity criterion:

$$\Sigma_{i=1}^k \alpha^i = 1, \forall i \in \{1, \ldots, k\}. \qquad \text{EQ. 4}$$

Additionally, based on convexity, the estimated convex coefficients $\hat{\alpha}_t^i$, $\forall i \in \{1, \ldots, k\}$, are constrained as follows at step t within a convex domain:

$$\Sigma_{i=1}^k \hat{\alpha}_t^i = 1, \forall t \in T \qquad \text{EQ. 5}$$

where k is the number of neural networks $N^i(w^i, x)$.

Multi-model structure 500 is trained using two distinct loss functions, which are used concurrently to simultaneously train each model 502a-502k (illustratively, neural networks $N_i(w^i, x)$, i=1, 2, and k). One loss function is a local loss metric $\mathcal{L}_t^i$. The other is a global loss metric $g_t$. For each model 502a-502k there is a corresponding loss function. The local loss metric is defined as the cross-entropy of outputs of each $N^i(w^i, x)$:

$$\mathcal{L}_t^i = \Sigma_{j=1}^m y_{j,t}^i \log \hat{y}_{j,t}^i \qquad \text{EQ. 6}$$

where $y_{j,t}^i$ is the predicted probability of the j-th label for the i-th neural network at step t and m is the total number of classes (labels) for output $y^i$ (in the case of the binary classifier, above, there is only one class).

The global loss metric, $g_t$, is defined as the difference between the true or correct value (label), $y_t$, and the predicted value (label), $\hat{y}_t$:

$$g_t = y_t - \hat{y}_t \qquad \text{EQ. 7}$$

Based on the convexity constraint, the global loss metric can be rewritten as follows:

$$g_t = y_t - (\hat{\alpha}_t^1 N_t^1 + \hat{\alpha}_t^2 N_t^2 + \ldots + \hat{\alpha}_t^k N_t^k) = \\ \sum_{i=1}^k \hat{\alpha}_t^i y_t - (\hat{\alpha}_t^1 N_t^1 + \hat{\alpha}_t^2 N_t^2 + \ldots + \hat{\alpha}_t^k N_t^k) = \\ \sum_{i=1}^{k-1} \hat{\alpha}_t^i g_t^i + \hat{\alpha}_t^k g_t^k = \sum_{i=1}^{k-1} \hat{\alpha}_t^i g_t^i + \left(1 - \sum_{i=1}^{k-1} \hat{\alpha}_t^i\right) g_t^k = \sum_{i=1}^{k-1} \hat{\alpha}_t^i \tilde{g}_t^i + g_t^k \qquad \text{EQ. 8}$$

where $N_t^i$ is the i-th model output at step t, $N_t^i(\hat{w}_t^i, x_t)$, and $g_t^i$ is defined as the difference between the target output and the i-th model output at step t:

$$g_t^i = y_t - N_t^i. \qquad \text{EQ. 9}$$

The difference between the i-th neural network (or other model) loss function and last (k-th) neural network (or other model) loss function is $\tilde{g}_t^i$, which is defined as follows:

$$\tilde{g}_t^i = g_t^i - g_t^k. \qquad \text{EQ. 10}$$

The loss function derived from EQ. 8 can be further simplified as follows:

$$\tilde{g}_t = \tilde{\mathcal{G}}_t^T \hat{\alpha}_t \qquad \text{EQ. 11}$$

where $\tilde{g}_t = g_t - g_t^k$, $\tilde{\mathcal{G}}_t^T \in \mathbb{R}^{m \times (k-1)}$ (for m classes and k neural networks or other machine learning models) is defined as $\tilde{\mathcal{G}}_t = [\tilde{g}_t^1, \tilde{g}_t^2, \ldots, \tilde{g}_t^{k-1}]$, and a convex coefficient vector is defined as $\hat{\alpha}_t = [\hat{\alpha}_t^1, \hat{\alpha}_t^2, \ldots, \hat{\alpha}_t^{k-1}] \in \mathbb{R}^{(k-1) \times 1}$.

The local loss and global loss metrics are used to train the neural networks (or other machine learning models) simultaneously. The local loss metric $\mathcal{L}_t^i$ is used to train each individual neural network $N^i(\hat{w}_t^i, x_t)$ by adjusting the adaptive weights $\hat{w}_t^i$ through backpropagation of error terms. The global loss metric $g_t$ together with the derived global loss metric matrix $\tilde{\mathcal{G}}_t^T$ is used to train the convex coefficient vector $\hat{\alpha}_t$ at the same time.

Using the derived global loss metric matrix $\tilde{\mathcal{G}}_t^T$ to train the convex coefficients provides distinct advantages described below. Multiplying both sides of EQ. 11 by $\tilde{\mathcal{G}}_t$ yields:

$$\tilde{\mathcal{G}}_t \tilde{g}_t = \tilde{\mathcal{G}}_t \tilde{\mathcal{G}}_t^T \hat{\alpha}_t \quad \text{EQ. 12}$$

The machine learning rule for the convex coefficients follows from EQ. 12:

$$\delta\hat{\alpha}_t = -\tilde{\mathcal{G}}_t \tilde{\mathcal{G}}_t^T \hat{\alpha}_t + \tilde{\mathcal{G}}_t \tilde{g}_t \quad \text{EQ. 13}$$

where $\delta\hat{\alpha}_t \triangleq \hat{\alpha}_{t+1} - \hat{\alpha}_t$. Hence, it follows that the machine learning rule for the convex coefficients $\hat{\alpha}_t$ is:

$$\hat{\alpha}_{t+1} = \hat{\alpha}_t - \tilde{\mathcal{G}}_t \tilde{\mathcal{G}}_t^T \hat{\alpha}_t + \tilde{\mathcal{G}}_t \tilde{g}_t \quad \text{EQ. 14}$$

Thus, as described, each of the neural networks $N^i(w^i, x)$ is trained through backpropagation using a local loss metric $\mathcal{L}_t^i$ (e.g., cross-entropy), the i-th local loss metric corresponding to the i-th neural network. A global loss metric $\tilde{\mathcal{G}}_t^T$ (k−1×m matrix) is generated based on the outputs of each of the multiple neural networks and is used to train the convex coefficients $\hat{\alpha}_t^i$, which satisfy the condition $\Sigma_{i=1}^k \hat{\alpha}_t^i$ at each iterative step t. As noted above, the local loss and global loss metrics are used to train the neural networks (or other machine learning models) simultaneously. The global loss metric $\tilde{\mathcal{G}}_t^T$ provides the basis of the convex coefficient machine learning rule. During training, the global loss metric $\tilde{\mathcal{G}}_t^T$ determines the degree of closeness between the values predicted by the multi-model structure and the true or target values of the training examples and adjusts the multi-model structure parameters accordingly. The model parameters, as directed stepwise by the global loss metric $\tilde{\mathcal{G}}_t^T$, are iteratively adjusted until the model achieves an acceptable level of predictive accuracy when applied to a set of test data.

The following pseudo code implements an algorithm for training a multi-model structure in accordance with the aspects described:

```
Input Data: X, Output Labels: Y
Number of iterations = inter, n = 0
Initialize N^i, i ∈ {1,..., k}
Initialize weight vector of N^i: w^i_0
Initialize the convex coefficients of N^i: α̂^i_0
while t < iter do
  choose x_t from X, target label y_t
  for i = 1 → k do
    ŷ^i_t ← N^i(ŵ^i_t, x_t)
    g^i_t ← y_t − ŷ^i_t
    local loss: L^i_t ← Σ^n_{j=1} y^i_{j,t} log ŷ^i_{j,t}
    backpropagate training w^i_t using L^i_t
  end for
  global loss: g_t ← Σ^k_{i=1} α̂^i_t g^i_t
  g̃^i_t ← g^i_t − g_t
  G̃_t = [g̃^1_t, g̃^2_t,...,g̃^{k-1}_t]
```

-continued

```
Convex coefficient training: α̂_{t+1} = α̂_t − G̃_t G̃^T_t α̂t + G̃_t g̃_t
n → n + 1
end while
```

Backpropagation used in training each individual domain-specific model (e.g., neural network) is based on gradient descent optimization, which involves calculating the gradient of non-linear activation functions—a relatively slower process requiring more time than adjusting convex coefficients. The convex coefficient machine learning rule (EQ. 15) for updating the convex coefficients is a linear difference equation, which provides relatively faster convergence. The multi-model structure trained according to the procedures described generates a model-predicted output that is close to the true target value once the convex coefficients converge. The global loss metric is a convex combination of functions ($g_t^i$) and accordingly is a convex function. Thus, some advantages of the multi-model structure are faster learning speed and more likely avoidance of the gradient vanishing problem owing to faster convergence.

At each training step, the estimated convex coefficients satisfy the constraint that $\hat{\alpha}_t^k = 1 - \Sigma_{i=1}^{k-1} \hat{\alpha}_t^i$. Accordingly, only k−1 convex coefficients need to be calculated at each step t.

It is noted that to form a convex hull based on outputs of the multiple domain-specific models, the number of models k needs to be at least one greater than the number of output classes, or labels, n. That is, k≥n. Although, for the binary classifier described above, n is one, and thus the constraint is easily satisfied. In general, even though the constraint appears to increase the total number of parameters needed, in fact, as verified by simulations, with multiple neural networks a smaller number of hidden layers can be used with the multi-model structure. Moreover, as also verified by simulations, even better performance can be achieved with the smaller number of hidden layers. Even if the constraint is not satisfied, the multi-model structure nevertheless can be trained, but there may be no real-valued solutions, only numerical approximations, which can adversely affect performance.

An aspect of the global loss metric $\tilde{\mathcal{G}}_t^T$ is the generation of collaborative information based on integrating the information generated by separate, domain-specific models during training. For example, a SLU system using the multi-model structure can be trained by leveraging the collaborative information to identify multiple intents within a single utterance. The global loss metric $\tilde{\mathcal{G}}_t^T$ enables the SLU system to overcome the limitation of conventional SLU systems that, even if combined, operate independently of one another and thus are unable to integrate or combine information from one model with information from any of the other models. The collaborative information of the multi-model structure is embodied in the set of convex coefficients, $\alpha_1, \alpha_2, \ldots, \alpha_k$, that, as described above, are used to weight the outputs $y_1, y_2, \ldots, y_k$ respectively, of each of k domain-specific models of the multi-model structure. Each product term $\alpha_i y_i$ determines whether a corresponding intent is likely expressed in a single user utterance represented by feature vector, x.

Thus, for example, in accordance with the embodiment described in the context of FIG. 4, if $\alpha_i y_i$ is greater than a predetermined threshold (e.g., 0.5), the utterance represented by feature vector, x, expresses an intent corresponding to the i-th domain. The determination is not based solely on the i-th model determination $y_i$, however, but on the i-th model determination and the collaborative information embodied in the coefficient $\alpha_1$ trained based on the global loss metric. The global loss metric incorporates the influence of the other models of the multi-model structure. Accordingly, the multiple models of the multi-model structure are not independent, but rather, each jointly reflects the information embodied in each of the other models. In the context of a SLU system, this aspect of the multi-model structure enables a SLU system that incorporates the structure to overcome the limitation of conventional SLU systems, which even if combined operate independently of one another and are unable to integrate or combine the information from multiple models.

Figure 6:
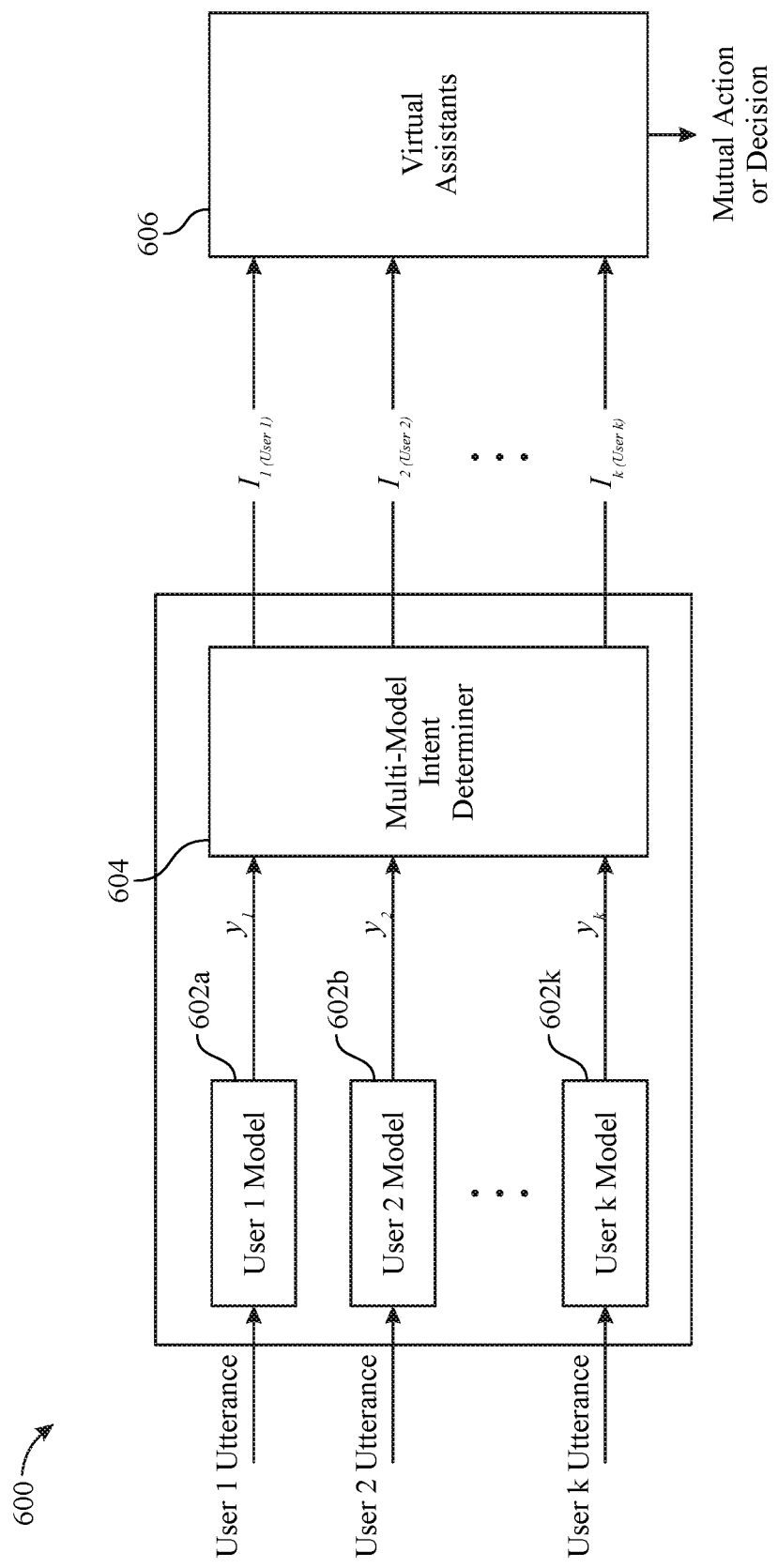
FIG. 6 schematically illustrates certain operative features of a multi-model structure for determining dialogue intents of multiple users according to an embodiment.

The multi-model structure, in different embodiments, can be extended so as to determine one or more intents of multiple users based on utterances expressed (via voice or text) during a dialogue between two or more users. FIG. 6 illustrates certain operative features of multi-model structure 600, which operates jointly among multiple devices (e.g., smartphones) of multiple users to provide dialogue intent detection according to an embodiment. Multi-model structure 600 illustratively includes user-specific models 602*a*, 602*b*, 602*k*, corresponding to different users who each use a separate device, and multi-model intent determiner 604 running on a networked server communicatively coupled via a data communications network to each of the separate devices. Although only three models corresponding to three users are shown, it should be understood that the number of models can be any number greater than one. Each model 602*a*-602*k* can be operatively coupled, for example, with a virtual assistant running on a respective device. Based on the above-described procedures, multi-model structure 600 can determine from user utterances one or more intents, $I_1$, $I_2$, and $I_k$, which are conveyed, respectively, to the virtual assistants—collectively, virtual assistants 606—running on the user devices.

A dialogue between two or more users can trigger the virtual assistant running on each device of a user engaged in the dialogue. Each such virtual assistant is personalized to the specific user and contains preferences of that person (e.g., phone information, Web browsing information), which can be taken into consideration for making a mutual decision involving each user engaged in the dialogue. Multi-model structure 600 can determine intents of each user based on output of user-specific model 602*a*, 602*b*, and/or 602*k* generated in response to utterances of a respective user. For example, a user, Joan, may ask the virtual assistant running on her device (e.g., smartphone), "can you book a flight for me and Amy to go from New York to San Francisco next Saturday, make a reservation with Hertz and Hilton for two days, and get me a price?" Based on the dialogue, multi-model structure 600 determines an intent related to Amy and provides the intent to Joan's virtual assistant, which contacts Amy using, possibly, the personalized phone information available from Joan's device.

The processing of Joan's utterance is conditioned on Amy's assent. If multi-model structure 600 determines that Amy's intent is to join Joan for the suggested travel, the processing continues with respect to the intents expressed initially by Joan. Otherwise, processing terminates if Amy responds in the negative. For example, if Amy responds by saying, for example, "would love to go, but I have a scheduling conflict, multi-model structure 600 determines Amy's intent is not to join Joan on the trip and based on that model-determined intent, no further processing occurs. If, instead, Amy responds to the virtual assistant query by saying something like "yes, I'm free those days and would like to go," then processing continues. Accordingly, multi-model structure 600 determines Amy's intent, which affirms her wish to join Joan in travel to the indicated location on the indicated data, and in response multi-model structure 600 determines from Joan's utterance Joan's intent to book an airline flight for herself and Amy, reserve a rental car (though not explicitly stated), reserve hotel rooms for two days (though also not explicitly stated), from Saturday on, and to get prices for each (inferred from the single reference to price). The user's virtual assistants 606 can complete the actions (book tickets, reserve rooms, rent car, and provide pricing information) based on the mutual decision made in response to the user intents.

In still other embodiments, a multi-model structure can be used to determine one or more user intents based on images. A multi-model structure can determine one or more user intents from images based on outputs generated by multiple domain-specific models, such as deep learning neural networks. Deep learning neural networks are often used to classify camera images. Using backpropagation, the neural networks can learn a variety of target functions that classify images. For example, images having 120×128 resolution, with each image pixel described by a greyscale intensity between 0 (black) and 255 (white), have long been used to train neural networks to classify images based on facial expressions, to identify different people in an image, to determine the direction a person in an a picture is looking, to discern whether or not the person is wearing sunglasses, and even to classify people as to gender. Images can be encoded as 3-D arrays and labeled with a corresponding 1-D array of classifier labels. A multi-model structure for determining intents based on images can use multiple, domain-specific deep learning neural networks trained, as described above, according to the convex coefficient machine learning rule using local and global loss metrics.

For example, a user may capture an image from a travel brochure using, for example, a camera integrated in a smartphone or other device of the user. The device can communicatively couple via a data communications network to a network server that hosts a system which implements the multi-model structure. The multi-model structure can be trained to identify one or more intents based on output from, for example, multiple, domain-specific deep learning neural networks trained according to the procedures described above. The device can convey the image to the system hosted on the network server. The deep learning neural networks, for example, can recognize from the image text describing an island resort and images of a hotel adjacent a beach. From the image, the multi-model structure can determine one or more intents. The multi-model structure can be trained, for example, to determine a user intent to retrieve (e.g., via the Internet) more information about the resort and the quality of nearby beaches. The multi-model structure can be trained, for example, to determine a user intent to obtain pricing information regarding fares to the island and room rental rates at the resort. In various embodiments, the multi-model structure can be trained to determine various other intents based on various other types of images.

Figure 7:
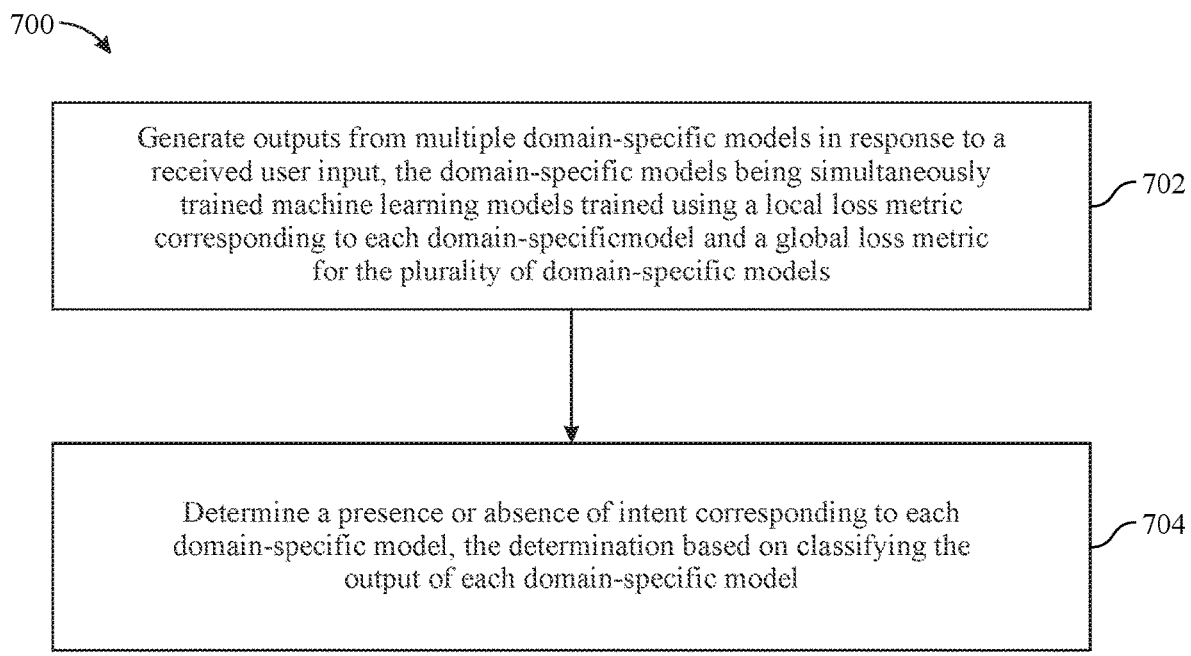
FIG. 7 is a flowchart of a method of determining user intents based on utterances according to an embodiment.

FIG. 7 is a flowchart of example method 700 for determining user intent from an utterance (speech or text) according to an embodiment. Method 700 can be performed by a system the same or similar to the systems described in reference to FIGS. 1-6. Illustratively, the system at block 702 generates outputs from multiple domain-specific models in response to a received input. The domain-specific models are simultaneously trained machine learning models that are trained using a corresponding local loss metric for each domain-specific model and a global loss metric for the plurality of domain-specific models. At block 704, the system determines a presence or absence of intent corresponding to each domain-specific model, the determination based on classifying the output of each domain-specific model.

The domain-specific models may be simultaneously trained by iteratively adjusting parameters of each domain-specific model based on a series of error terms, each error term determined by the difference between a model-predicted value and a true value. Each model-predicted value can be a sum of products, each product being the product of an output of a domain-specific model times a convex coefficient corresponding to the domain-specific model.

The domain-specific models can be simultaneously trained by generating an initial plurality of convex coefficients and iteratively adjusting one or more of the plurality of coefficients based on a convex coefficient machine learning rule determined using the global loss metric.

In some embodiments, each domain-specific model is a neural network. In some embodiments, the received input comprises an utterance. The utterance can be text or speech that is converted to text using a speech-to-text processor. In other embodiments, the received input can comprise one or more images.

In still other embodiments, the received input can comprise input from multiple devices of multiple users. For determining the intents of multiple users based on utterances expressed (via voice or text) during a dialogue between two or more users, the domain-specific models can comprise user-specific models. The multi-model structure can determine one or more user intents based on a dialog between the multiple users carried out using the multiple devices.

Figure 8:
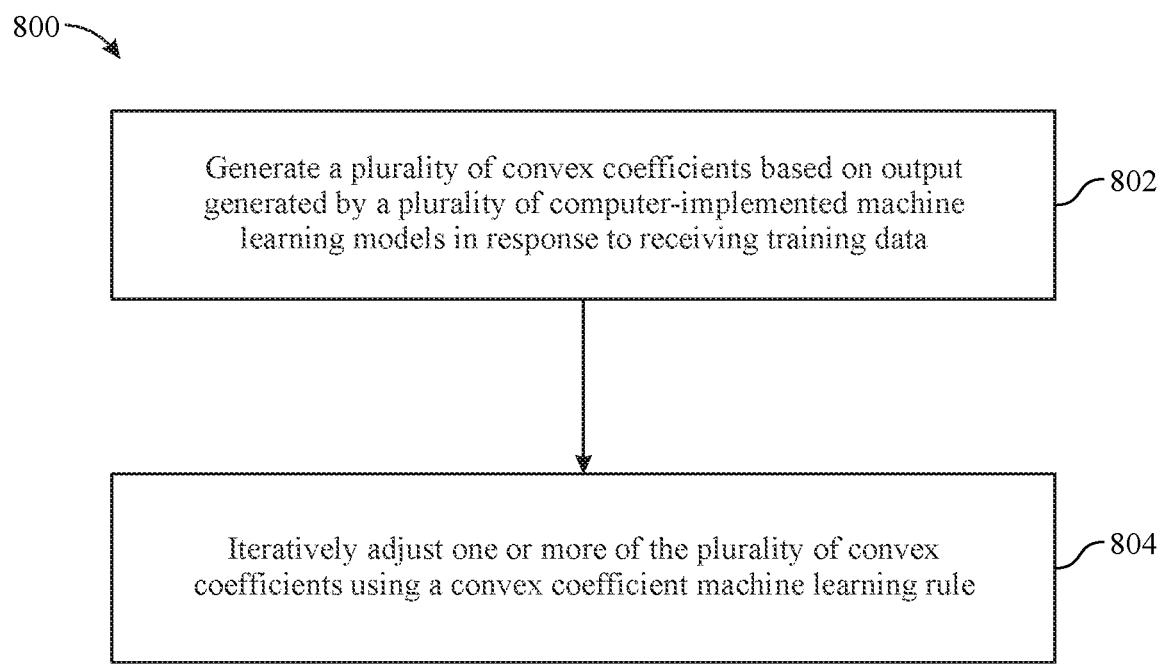
FIG. 8 is a flowchart of a method for training a multi-model structure for determining user intents based on utterances according to an embodiment.

FIG. 8 is a flowchart of an example method for training a multi-model structure, according to an embodiment. Method 800 can be performed by a system the same or similar to the systems described in reference to FIGS. 1-6. The system at block 802 generates a plurality of convex coefficients based on output generated by a plurality of computer-implemented machine learning models in response to receiving training data. At block 804, the system iteratively adjusts one or more of the plurality of convex coefficients using a convex coefficient machine learning rule. The convex coefficient machine learning rule is determined based on the global loss metric, as derived above by EQs. 12-14.

Each of the machine learning models can be trained using a corresponding local loss metric and the global loss metric. The training of the machine learning models can be performed simultaneously with the iteratively adjusting of one or more of the plurality of convex coefficients.

The global loss metric can be determined based on a difference between a correct classification of the training data and an estimated classification of the training data generated by the plurality of computer-implemented models. The estimated classification of the training data can comprise a sum of outputs generated by the plurality of computer-implemented machine learning models, each of the outputs being weighted by a corresponding one of the plurality of convex coefficients.

The plurality of computer-implemented models can comprise neural networks. Each neural network can be trained through backpropagation of errors computed based on a local loss metric, the errors being the differences between correct classifications of the training data and estimated classifications of the training data generated by each of the neural networks. Training each of the neural networks can be performed concurrently with the iteratively adjusting of one or more of the plurality of convex coefficients. The local loss metric can be a cross-entropy metric.

The accuracy of the multiple machine learning models, once trained, can be determined based on classifying a set of test data. Element of the set of test data can be classified based on a weighted sum of outputs generated by the machine learning models, with each of the outputs weighted by a corresponding one of the plurality of convex coefficients.

The terminology used herein is only for the purpose of describing particular embodiments and is not intended to be limiting. Notwithstanding, several definitions that apply throughout this document are now presented.

As defined herein, the singular forms of terms "a," "an," and "the" are intended to include the plural forms as well, unless the context clearly indicates otherwise.

As defined herein, "another" means at least a second or more.

As defined herein, "at least one," "one or more," and "and/or," are open-ended expressions that are both conjunctive and disjunctive in operation unless explicitly stated otherwise. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, "automatically" means without user intervention.

As defined herein, "computer readable storage medium" means a storage medium that contains or stores program code for use by or in connection with an instruction execution system, apparatus, or device. "Computer readable storage medium," as defined herein, is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. Memory elements, as described herein, are examples of a computer readable storage medium. A non-exhaustive list of more specific examples of a computer readable storage medium may include: a portable computer diskette, a hard disk, a random-access memory (RAM), a read-only memory (ROM), an erasable programmable read-only memory (EPROM or Flash memory), a static random-access memory (SRAM), a digital versatile disk (DVD), a memory stick, a floppy disk, or the like.

As defined herein, "includes," "including," "comprises," and/or "comprising," specify the presence of stated features, integers, steps, operations, elements, and/or components, but do not preclude the presence or addition of one or more other features, integers, steps, operations, elements, components, and/or groups thereof.

As defined herein, "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, "output" means storing in physical memory elements, e.g., devices, writing to display or other peripheral output device, sending or transmitting to another system, exporting, or the like.

As defined herein, "processor" means at least one hardware circuit configured to carry out instructions contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application-specific integrated circuitry (ASIC), programmable logic circuitry, and a controller.

As defined herein, "in response to" and "responsive to" mean responding or reacting readily to an action or event. Thus, if a second action is performed "in response to" or "responsive to" a first action, there is a causal relationship between an occurrence of the first action and an occurrence of the second action. The terms "in response to" and "responsive to" indicate the causal relationship.

As defined herein, "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the terms "user" and "individual" mean a human being.

The terms first, second, etc. may be used herein to describe various elements. These elements should not be limited by these terms, as these terms are only used to distinguish one element from another unless stated otherwise or the context clearly indicates otherwise.

Various embodiments of the inventive aspects disclosed herein may be implemented in a system, as a method, and/or in a computer program product at any possible technical detail level of integration. The computer program product may include a computer readable storage medium (or media) having computer readable program instructions thereon for causing a processor to carry out aspects of the embodiments disclosed herein. "Program code" is used interchangeably with "computer readable program instructions" within this disclosure. Computer readable program instructions described herein may be downloaded to respective computing/processing devices from a computer readable storage medium or to an external computer or external storage device via a network, such as the Internet, a LAN, a WAN, and/or a wireless network. The network may include copper transmission cables, optical transmission fibers, wireless transmissions, routers, firewalls, switches, gateway computers, and/or edge devices including edge servers. A network adapter cord or network interface in each computing/processing device receives computer readable program instructions from the network and forwards the computer readable program instructions for storage in a computer readable storage medium with the respective computing/processing device.

Computer readable program instructions for carrying out operations of the inventive arrangements disclosed herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language and/or procedural programming languages. The computer readable program instructions may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products according to embodiments of the inventive arrangements. It should be understood that each block of the flowchart illustrations and/or block diagrams, and combinations of blocks in the flowchart illustrations and/or block diagrams, can be implemented by computer readable program instructions (e.g., program code).

These computer readable program instructions may be provided to a processor of a computer, special-purpose computer or other programmable data processing apparatus to produce a machine, such that the instructions, which execute via the processor of the computer or other programmable data processing apparatus, create means for implementing the functions/acts specified in the flowchart and/or block diagram block or blocks. Operatively coupling the processor to program code instructions transforms the machine of the processor into a special-purpose machine for carrying out the instructions of the program code. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the inventive arrangements described herein. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments provided herein have been presented for purposes of illustration and are not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art understand the embodiments disclosed herein. Modifications and variations may be apparent to those of ordinary skill in the art without departing from the scope and spirit of the described inventive arrangements. Accordingly, reference should be made to the following claims, rather than the foregoing disclosure, as indicating the scope of such features and implementations.

What is claimed is:

1. A method of training a multi-model structure, comprising:
    generating a plurality of convex coefficients based on output generated by a plurality of different computer-implemented machine learning models in response to receiving same training data; and
    iteratively adjusting, using computer hardware, one or more of the plurality of convex coefficients of the plurality of different computer-implemented machine learning models using a convex coefficient machine learning rule, wherein
    the plurality of different computer-implemented machine learning models are trained using a plurality of local loss metrics and a global loss metric;
    wherein each of the plurality of local loss metrics is specific to one of the plurality of different computer-implemented machine learning models, and wherein the global loss metric is operative across the plurality of different computer-implemented machine learning models.

2. The method of claim 1, wherein
    the training of each of the plurality of computer-implemented machine learning models occurs simultaneously with the iteratively adjusting one or more of the plurality of convex coefficients.

3. The method of claim 1, wherein
    the global loss metric is determined based on a difference between a correct classification of the training data and an estimated classification of the training data determined by the plurality of computer-implemented machine learning models.

4. The method of claim 3, wherein
    the estimated classification of the training data comprises a sum of outputs generated by the plurality of computer-implemented machine learning models, each of the outputs weighted by a corresponding one of the plurality of convex coefficients.

5. The method of claim 1, wherein
    the plurality of computer-implemented models comprise neural networks, and further comprising training each of the neural networks through backpropagation of errors computed based on the corresponding local loss metric,
    the errors based on differences between correct classifications of the training data and estimated classifications of the training data generated by the neural networks.

6. The method of claim 5, wherein
    the corresponding local loss metric comprises a cross-entropy metric.

7. The method of claim 1, further comprising determining an accuracy of the plurality of computer-implemented machine learning models based on classifying a set of test data, wherein
    the set of test data is classified based on a weighted sum of outputs generated by the plurality of computer-implemented machine learning models, each of the outputs weighted by a corresponding one of the plurality of convex coefficients.

8. A system, comprising:
    a processor configured to initiate operations including:
        generating an output from each of a plurality of domain-specific models in response to a received input, wherein
        the domain-specific models are machine learning models simultaneously trained using a corresponding local loss metric for each domain-specific model and a global loss metric for the plurality of domain-specific models; and
        determining a presence or absence of intent corresponding to each domain-specific model by classifying the output of each domain-specific model.

9. The system of claim 8, wherein
    the domain-specific models are simultaneously trained by generating an initial plurality of convex coefficients and iteratively adjusting one or more of the plurality of convex coefficients based on a convex coefficient machine learning rule determined using the global loss metric.

10. The system of claim 9, wherein
    each corresponding local loss metric is determined by a series of error terms, each error term determined by a difference between a model-predicted value and a true value.

11. The system of claim 10, wherein
    the model-predicted value is a sum of products and wherein each product is the product of an output of a domain-specific model times a convex coefficient corresponding to the domain-specific model.

12. The system of claim 8, wherein
    each of the plurality of domain-specific models is a neural network.

13. The system of claim 8, wherein
    the received input comprises at least one of an utterance or an image.

14. The system of claim 8, wherein
    the received input comprises input from multiple devices of multiple users and wherein at least one domain-specific model comprises a user-specific model.

15. A method, comprising:

generating, with computer hardware, an output from each of a plurality of domain-specific models in response to a received input, wherein the domain-specific models are machine learning models simultaneously trained using a corresponding local loss metric for each domain-specific model and a global loss metric for the plurality of domain-specific models; and determining, with the computer hardware, a presence or absence of intent corresponding to each domain-specific model by classifying the output of each domain-specific model.

16. The method of claim 15, wherein the domain-specific models are simultaneously trained by generating an initial plurality of convex coefficients and iteratively adjusting one or more of the plurality of convex coefficients based on a convex coefficient machine learning rule determined using the global loss metric.

17. The method of claim 16, wherein each corresponding local loss metric is determined by a series of error terms, each error term determined by a difference between a model-predicted value and a true value.

18. The method of claim 17, wherein the model-predicted value is a sum of products and wherein each product is the product of an output of a domain-specific model times a convex coefficient corresponding to the domain-specific model.

19. The method of claim 15, wherein each of the plurality of domain-specific models is a neural network.

20. The method of claim 15, wherein the received input comprises at least one of an utterance or an image.

21. The method of claim 15, wherein the received input comprises input from multiple devices of multiple users and wherein at least one domain-specific model comprises a user-specific model.

22. A computer program product comprising one or more computer readable storage media having program instructions collectively stored therein, the program instructions executable by one or more processors to cause the one or more processors to initiate operations comprising:

generating an output from each of a plurality of domain-specific models in response to a received input, wherein the domain-specific models are machine learning models simultaneously trained using a corresponding local loss metric for each domain-specific model and a global loss metric for the plurality of domain-specific models; and determining a presence or absence of intent corresponding to each domain-specific model by classifying the output of each domain-specific model.

23. The computer program product of claim 22, wherein the domain-specific models are simultaneously trained by generating an initial plurality of convex coefficients and iteratively adjusting one or more of the plurality of convex coefficients based on a convex coefficient machine learning rule determined using the global loss metric.

24. The computer program product of claim 23, wherein each corresponding local loss metric is determined by series of error terms, each error term determined by a difference between a model-predicted value and a true value.

25. The computer program product of claim 24, wherein the model-predicted value is a sum of products and wherein each product is the product of an output of a domain-specific model times a convex coefficient corresponding to the domain-specific model.

26. The computer program product of claim 22, wherein the received input comprises at least one of an utterance or an image.

* * * * *